United States Patent
Busch

(10) Patent No.: US 9,178,436 B2
(45) Date of Patent: Nov. 3, 2015

(54) CLOSED-LOOP CONTROL CIRCUIT FOR AN AUXILIARY POWER SUPPLY UNIT AND POWER SUPPLY UNIT ARRANGEMENT

(75) Inventor: Peter Busch, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 493 days.

(21) Appl. No.: 13/818,503

(22) PCT Filed: Aug. 2, 2011

(86) PCT No.: PCT/EP2011/063312
§ 371 (c)(1),
(2), (4) Date: Apr. 8, 2013

(87) PCT Pub. No.: WO2012/025347
PCT Pub. Date: Mar. 1, 2012

(65) Prior Publication Data
US 2014/0175883 A1      Jun. 26, 2014

(30) Foreign Application Priority Data

Aug. 23, 2010   (DE) .......................... 10 2010 035 112

(51) Int. Cl.
*H02J 1/10*      (2006.01)
*H02M 3/335*    (2006.01)
*H02J 9/06*      (2006.01)

(52) U.S. Cl.
CPC ........... *H02M 3/33561* (2013.01); *H02J 1/102* (2013.01); *H02J 9/062* (2013.01); *H02M 3/33523* (2013.01); *Y10T 307/406* (2015.04)

(58) Field of Classification Search
USPC .......................................................... 307/43
See application file for complete search history.

(56) References Cited

U.S. PATENT DOCUMENTS

| | | | |
|---|---|---|---|
| 3,824,450 | A | 7/1974 | Johnson et al. |
| 4,628,433 | A | 12/1986 | Notohamiprodjo |
| 5,319,536 | A | 6/1994 | Malik |
| 2003/0132669 | A1 | 7/2003 | Bahl et al. |
| 2006/0139965 | A1 | 6/2006 | Gan et al. |

FOREIGN PATENT DOCUMENTS

| | | |
|---|---|---|
| DE | 197 22 125 A1 | 12/1998 |
| DE | 692 26 340 T2 | 3/1999 |
| JP | 02-026267 | 1/1990 |
| JP | 10-225125 | 8/1998 |
| JP | 2009-219209 | 9/2009 |

OTHER PUBLICATIONS

Japanese Examination Report dated Mar. 25, 2014 from corresponding Japanese Patent Application No. 2013-525216.

*Primary Examiner* — Robert Deberadinis
(74) *Attorney, Agent, or Firm* — DLA Piper LLP (US)

(57) ABSTRACT

A closed-loop control circuit for an auxiliary power supply unit includes a control loop for the closed-loop control of a voltage transformer of the auxiliary power supply unit via a controlled variable to produce a setpoint voltage, wherein the control loop includes an additional circuit that limits a change in the controlled variable in the event of provision of an external voltage of a main power supply unit at a first output for emitting voltage generated by the auxiliary power supply unit when the external voltage exceeds a setpoint voltage of the auxiliary power supply unit.

15 Claims, 7 Drawing Sheets

CLOSED-LOOP CONTROL CIRCUIT FOR AN AUXILIARY POWER SUPPLY UNIT AND POWER SUPPLY UNIT ARRANGEMENT

RELATED APPLICATIONS

This application is a §371 of International Application No. PCT/EP2011/063312, with an international filing date of Aug. 2, 2011 (WO 2012/025347 A2, published Mar. 1, 2012), which is based on German Patent Application No. 10 2010 035 112.1, filed Aug. 23, 2010, the subject matter of which is incorporated herein by reference.

TECHNICAL FIELD

This disclosure relates to a closed-loop control circuit for an auxiliary power supply unit comprising a control loop for the closed-loop control of a voltage transformer of the auxiliary power supply unit via a controlled variable. The disclosure also relates to a power supply unit arrangement comprising at least one main power supply unit and at least one auxiliary power supply unit.

BACKGROUND

Power supply unit arrangements comprising a main power supply unit and an auxiliary power supply unit are known. In particular, electronic appliances with a completely switched-on state and a so-called "standby" state and such a power supply unit arrangement are known. In that case, the auxiliary power supply unit performs the task of supplying power to the electronic appliance in the standby state, and the main power supply unit performs the task of supplying electricity to the electronic appliance in the operating state.

A problem with known power supply unit arrangements consists of feeding the voltage from the auxiliary power supply unit and the voltage from the main power supply unit to a common output of the power supply unit arrangement.

The provision of a voltage from an auxiliary power supply unit and a main power supply unit via a common output has several advantages. Inter alia, it is possible to dispense with the provision of an additional electrical contact between a power supply unit arrangement and the electronic appliance or its internal components if the output voltage of the auxiliary power supply unit is provided via an electrical output of the main power supply unit. Conversely, an output of an auxiliary power supply unit can be subjected to a greater load during operation if the main power supply unit in the switched-on state outputs a voltage generated by the main power supply unit in addition to an auxiliary voltage provided by the auxiliary power supply unit via this output. In addition, the consumer-side circuitry complexity can be reduced in both cases.

It could nonetheless be helpful to provide an improved power supply unit arrangement and a closed-loop control circuit for an auxiliary power supply unit which enable a voltage to be coupled in at a common output of a power supply unit arrangement, wherein energy efficiency of the power supply unit arrangement overall is maintained or improved.

SUMMARY

I provide a closed-loop control circuit for an auxiliary power supply unit including a control loop for the closed-loop control of a voltage transformer of the auxiliary power supply unit via a controlled variable to produce a setpoint voltage, wherein the control loop includes an additional circuit that limits a change in the controlled variable in the event of provision of an external voltage of a main power supply unit at a first output for emitting voltage generated by the auxiliary power supply unit when the external voltage exceeds a setpoint voltage of the auxiliary power supply unit.

I also provide a power supply unit arrangement including at least one main power supply unit that provides at least one first operating voltage that supplies an electrical consumer in a first operating state, and at least one auxiliary power supply unit that provides at least one second operating voltage that supplies the electrical consumer in a second operating state, wherein the electrical consumer has a lower power in a second operating state than in a first operating state, a setpoint voltage of the auxiliary power supply unit is below a control voltage of the main power supply unit, the at least one first operating voltage of the main power supply unit and the at least one second operating voltage of the auxiliary power supply unit are available to the electrical consumer via a common first output of the power supply unit arrangement, and the auxiliary power supply unit includes the closed-loop control circuit.

LIST OF REFERENCE SYMBOLS

Figure 1:
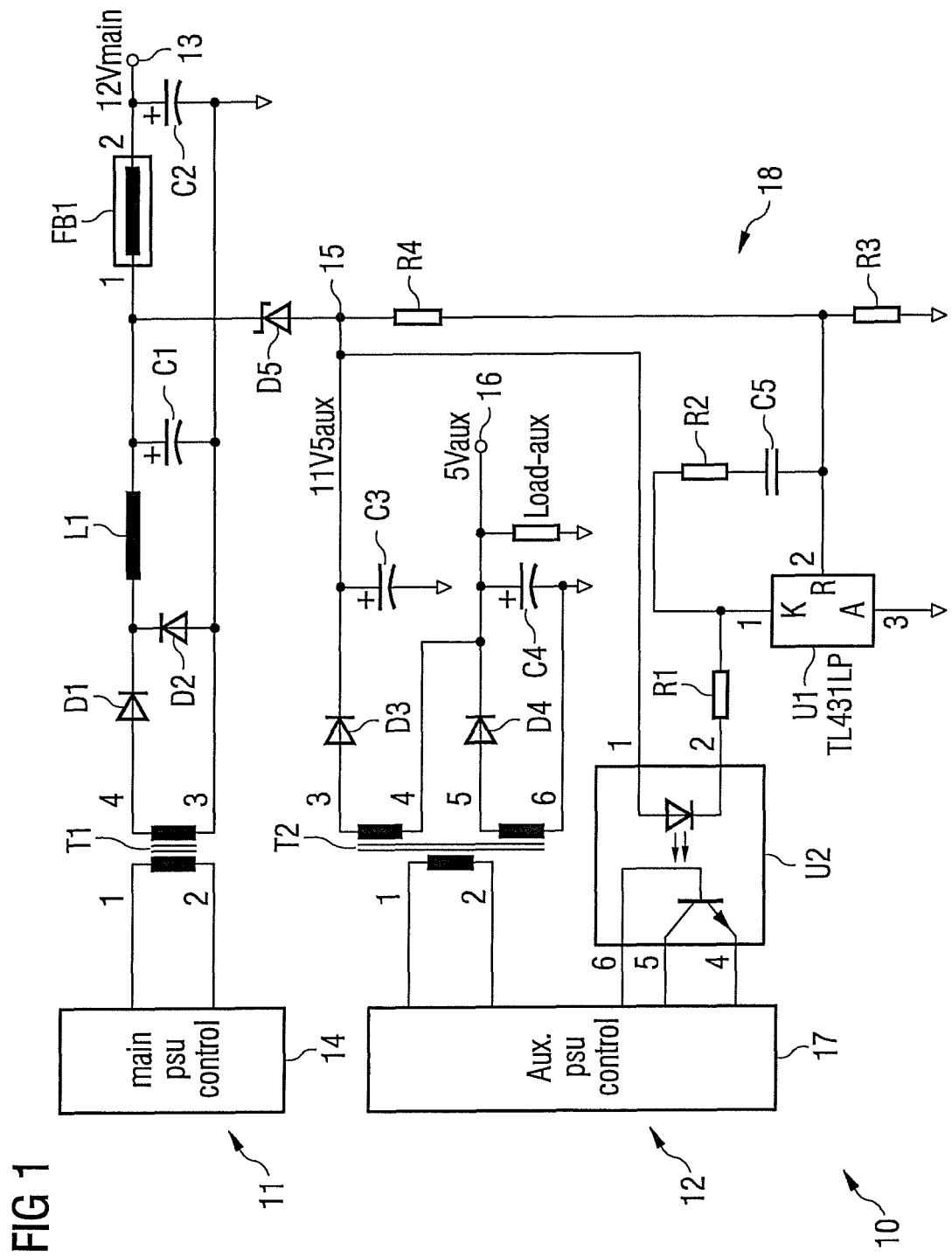
FIG. 1 shows a first circuit for coupling-in an output voltage of an auxiliary power supply unit to an output of a main power supply unit.

10 First power supply unit arrangement
11 Main power supply unit
12 Auxiliary power supply unit
13 First output (of main power supply unit)
14 Open-loop control circuit (of main power supply unit)
15 First node
16 Second output (of auxiliary power supply unit)
17 Open-loop control circuit (of auxiliary power supply unit)
18 Control loop
20 Second power supply unit arrangement
21 First output (of auxiliary power supply unit)
30 Third power supply unit arrangement
31 Additional circuit
32 Internal node
33 First electrical path
34 Second electrical path
40 Fourth power supply unit arrangement
50 Fifth power supply unit arrangement 60 Sixth power supply unit arrangement
61 First part (of converter circuit)
62 Second part (of converter circuit)
70 Seventh power supply unit arrangement

DETAILED DESCRIPTION

I provide a closed-loop control circuit for an auxiliary power supply unit which comprises a control loop for the closed-loop control of a voltage transformer of the auxiliary power supply unit via a controlled variable. In this case, the control loop comprises an additional circuit designed to limit a change in the controlled variable in the event of the provision of an external voltage of a main power supply unit at a first output emitting the voltage generated by the auxiliary power supply unit when the external voltage exceeds the setpoint voltage of the auxiliary power supply unit.

Such a closed-loop control circuit enables correct closed-loop control of an auxiliary power supply unit independently of the presence of an external voltage at a commonly used output. In other words, incorrect closed-loop control of the auxiliary power supply unit can be avoided by influencing the control loop of the auxiliary power supply unit if an external voltage, in particular an output voltage of a main power supply unit, is provided at an output of the auxiliary power supply unit. In particular, it is possible to prevent a situation in which the auxiliary power supply unit produces an excessively high or excessively low voltage than is required to maintain a desired voltage at the first output.

The controlled variable may comprise a duty factor to drive the voltage transformer of the auxiliary power supply unit, wherein the circuit prevents a drop in the duty factor to 0% independently of the presence of the external voltage. Such a circuit has the advantage that the auxiliary power supply unit also always remains ready for use in the case of the presence of an external voltage and, therefore, the voltage at the first output can be maintained when the external voltage is disconnected.

The controlled variable may comprise a control voltage at an internal node of the closed-loop control circuit, and the additional circuit prevents an increase in an internal voltage provided by the voltage transformer of the auxiliary power supply unit at the internal node, to the external voltage provided at the first output. By virtue of the limitation of the voltage at an internal node of the auxiliary power supply unit, disruption of the control loop by application of an external voltage can be avoided. This also avoids complete deactivation of the auxiliary power supply unit in the case where an external voltage is provided at a first output of the auxiliary power supply unit.

The closed-loop control circuit may be characterized by a first voltage divider that divides a voltage between the first output of the auxiliary power supply unit and a common reference potential, and a second voltage divider that divides a voltage between the internal node and the common reference potential. By virtue of the use of two different voltage dividers, it is possible to distinguish electrically between the output voltage at a common output and an internal control voltage of the auxiliary power supply unit. This enables in particular closed-loop control of the auxiliary power supply unit on the basis of the second voltage divider independently of the presence of a voltage at the first voltage divider.

I also provide a power supply unit arrangement comprising at least one main power supply unit that provides at least one first operating voltage to supply an electrical consumer in a first operating state, and at least one auxiliary power supply unit that provides at least one second operating voltage to supply the electrical consumer in a second operating state. In this case, the electrical consumer has a lower power in the second operating state than in the first operating state and a setpoint voltage of the auxiliary power supply unit is slightly below a control voltage of the main power supply unit. The at least one first operating voltage of the main power supply unit and the at least one second operating voltage of the auxiliary power supply unit are available to the electrical consumer via a common electrical output. The auxiliary power supply unit comprises a closed-loop control circuit in accordance with one of the above configurations.

By virtue of such a power supply unit arrangement, the output voltages of an auxiliary power supply unit and a main power supply unit are provided at a common electrical output.

Further advantageous configurations are explained in more detail with reference to the examples below. My control circuits and arrangement will be explained in more detail below using different examples with reference to the figures. In the figures, identical or similar components of different examples are provided with the same reference symbols.

FIG. 1 shows a first power supply unit arrangement 10 comprising a main power supply unit 11 and an auxiliary power supply unit 12. The main power supply unit 11 and the auxiliary power supply unit 12 operate largely independently of one another, but output their respective output voltages at least sometimes via a common first output 13. Typically, the auxiliary power supply unit 12 has a considerably lower output power than the main power supply unit 11.

The main power supply unit 11 is a switched-mode power supply unit designed on the basis of the principle of a forward converter. The forward converter comprises a transformer T1, diodes D1 and D2, a storage coil L1 and a storage capacitor C. A filter inductor FB1 and a smoothing capacitor C2 are used to smooth the output voltage generated. A supply voltage of 12 V, for example, is provided at the first output 13 by the main power supply unit 11. The level of the supply voltage is adjusted via an open-loop control circuit 14 (not illustrated in detail).

The auxiliary power supply unit 12 is a switched-mode converter of the flyback converter type that generates two different output voltages. To provide the auxiliary voltages, the flyback converter of the auxiliary power supply unit 12 comprises a second transformer T2, two rectifier diodes D3 and D4, two storage capacitors C3 and C4 and an open-loop control circuit 17. The open-loop control circuit 17 of the auxiliary power supply unit 12 operates independently of the open-loop control circuit 14 of the main power supply unit 11.

A first auxiliary voltage of 11.5 V, for example, is provided via a first node 15, i.e., a voltage which is slightly lower than the output voltage of the main power supply unit 11. A second auxiliary voltage of 5 V, for example, is provided via a second output 16. A symbolic load resistance is illustrated at the second output 16 which load resistance represents, inter alia, a current consumption of a secondary load of the power supply unit arrangement 10 itself or of an electronic appliance connected thereto of 1 mA, for example.

In addition to the open-loop control circuit 17, a closed-loop control circuit of the auxiliary power supply unit 12 comprises a control loop 18. The control loop 18 comprises a control amplifier U1, an optocoupler U2, four resistors R1, R2, R3 and R4 and a capacitor C5. The first auxiliary voltage at the first node 15 is monitored for closed-loop control. For this purpose, the first auxiliary voltage is divided via a voltage divider comprising the resistors R3 and R4. A discrepancy between the divided voltage and a setpoint value, for example, of 2.5 V, is detected and amplified via the control amplifier U1. The amplified output signal is passed on to the open-loop control circuit 17 for pulse-width control on the primary side of the auxiliary power supply unit 12 via the optocoupler U2. In this case, a relatively high current in the optocoupler U2 brings about a relatively low duty factor of the open-loop control circuit 17 to drive the transformer T2 and vice versa.

The first node 15 that outputs the first auxiliary voltage of 11.5 V is coupled to the first output 13 of the main power supply unit 11 via a Schottky diode D5 acting as a coupling-in diode and the filter inductor FB1, in the circuit shown in FIG. 1. Owing to the fact that the output voltage of the main power supply unit 11 is approximately 0.5 V higher than the first auxiliary voltage, the diode D5 turns off during operation of the main power supply unit 11. As a result, a disruption of the control loop 18 of the auxiliary power supply unit 12 by the output voltage of the main power supply unit 11 is avoided. In addition, it is thus ensured that the supply of electricity to the appliance connected to the power supply unit arrangement 10 takes place in any event via the main power supply unit 11 when the main power supply unit 11 is switched on, with the main power supply unit generally having better efficiency than the auxiliary power supply unit 12.

One disadvantage with the solution illustrated, however, is the additional voltage drop across the diode D5 when the main power supply unit 11 is disconnected. In the case of a Schottky diode, this voltage drop is only approximately 0.4 V. However, this results overall in an impairment of the efficiency of approximately 5% during operation of the auxiliary power supply unit 12.

Figure 2:
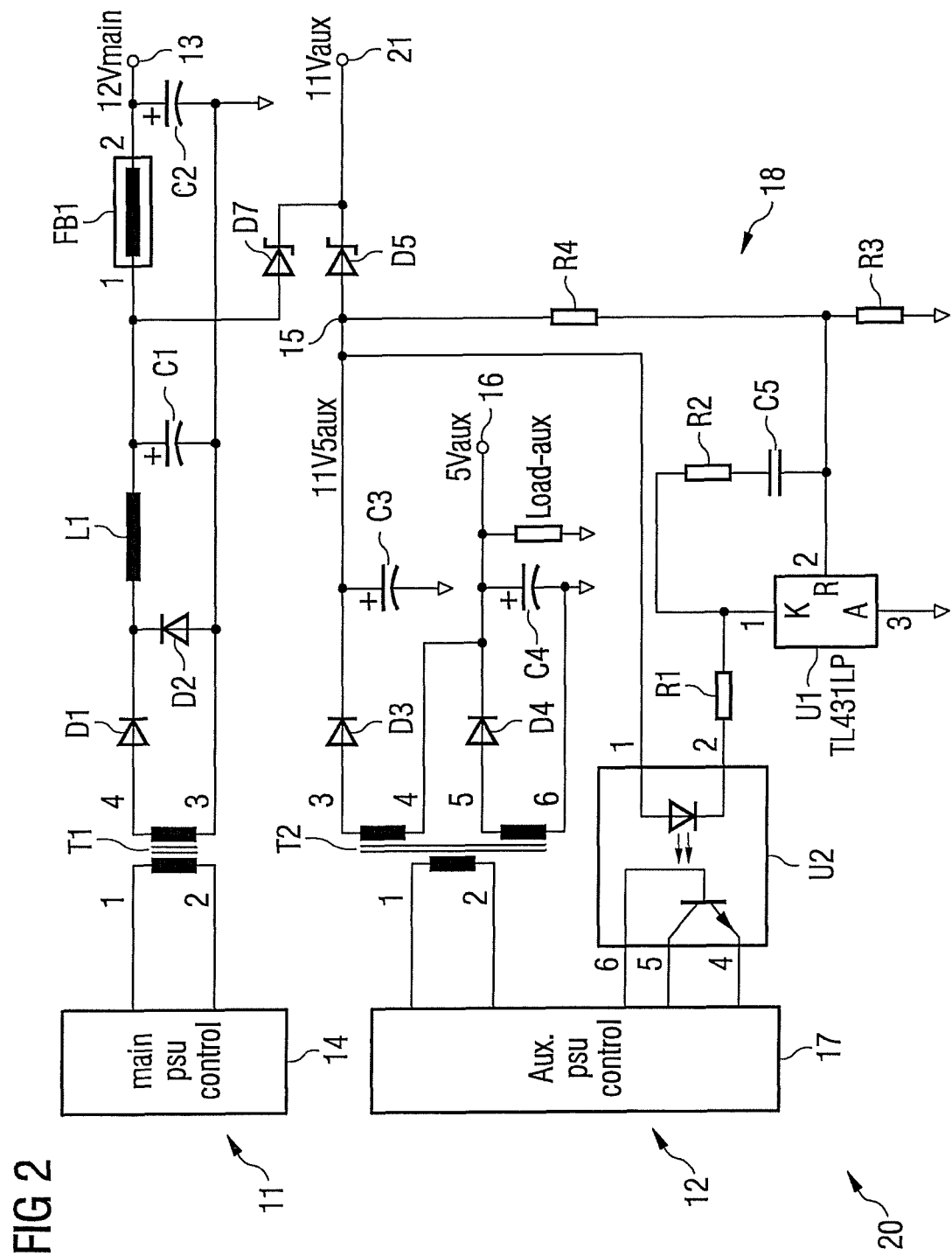
FIG. 2 shows a second circuit for coupling-in an output voltage of a main power supply unit to an output of an auxiliary power supply unit.

FIG. 2 shows a second power supply unit arrangement 20 for the case where an output voltage of a main power supply unit 11 is intended to be fed to a first output 21 of the auxiliary power supply unit 12. The design of the main power supply unit 11 and the auxiliary power supply unit 12 largely corresponds to that of the first power supply unit arrangement 10 shown in FIG. 1.

In the second power supply unit arrangement 20, both the main power supply unit 11 and the auxiliary power supply unit 12 connect to the common first output 21 of the main power supply unit 12 via a Schottky diode D7 and D5, respectively, on the output side. By virtue of the diode D5, undesired feedback to the control loop 18 of the auxiliary power supply unit 12 is avoided, as described with reference to FIG. 1. By virtue of the diode D7, the secondary output voltage of the forward converter of the main power supply unit 11 of approximately 12 V is reduced to a voltage of approximately 11.6 V at the first output 21.

In this case, too, the use of the additional coupling-in diode D5 results in an impairment of the efficiency of the auxiliary power supply unit 12 when the auxiliary voltage is applied via the first output 21, however.

To effect a further improvement of the energy efficiency of the power supply unit arrangements, no coupling-in diodes are used in the circuits below shown in FIGS. 3 to 7. In this case, there is the additional problem that a voltage which may be provided by the main power supply unit 11 would now disrupt the control loop 18 of the auxiliary power supply unit 12 of a power supply unit arrangement. In particular, the control amplifier U1 would incorrectly report back an excessively high output voltage of the flyback converter to the open-loop control circuit 17, which would result in a reduction in the duty factor to 0%. In this case, it can no longer be ensured that the auxiliary power supply unit 12 starts quickly enough to ensure a voltage supply even when the main power supply unit 11 is disconnected.

Figure 3:
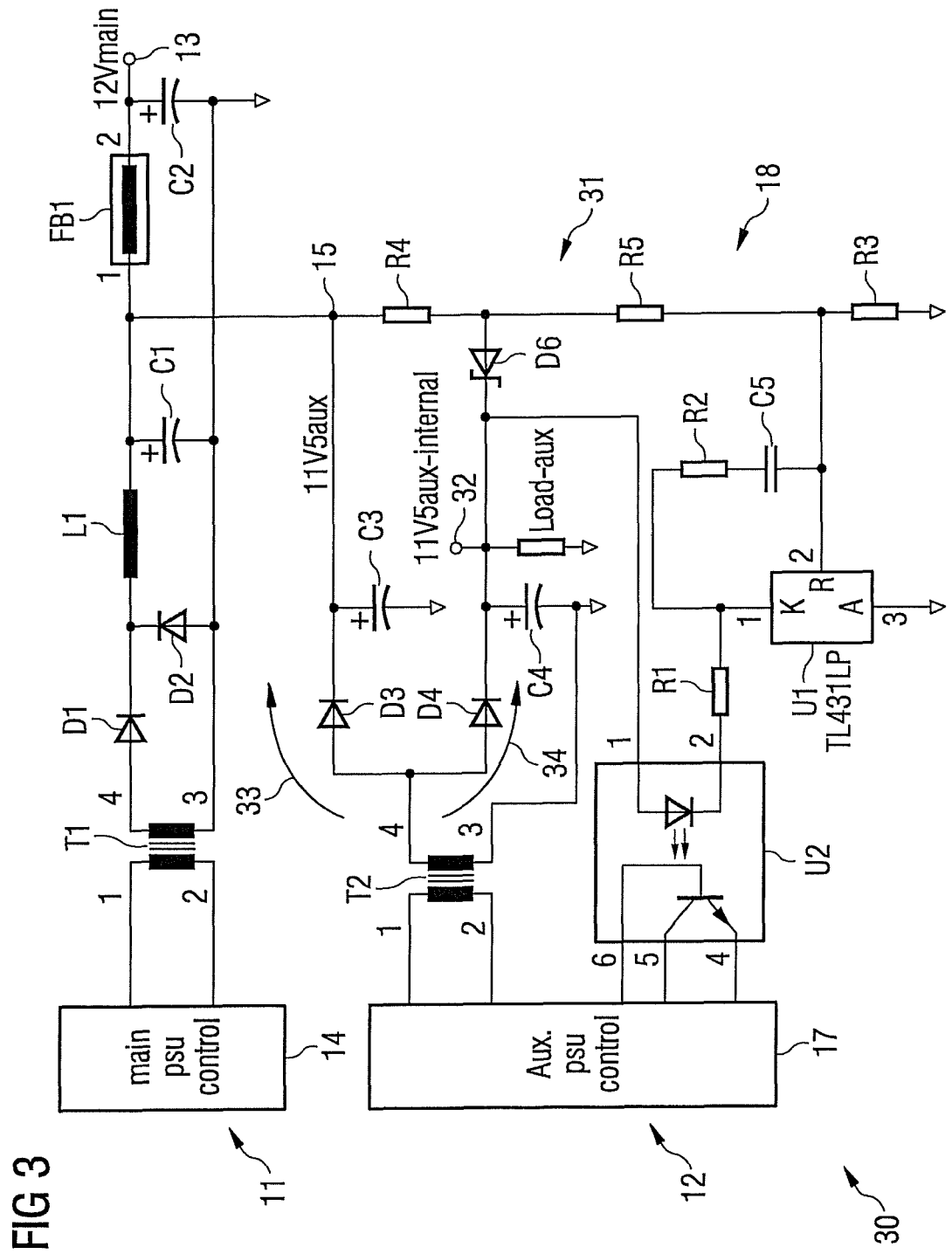
FIG. 3 shows a third circuit for coupling-in an output voltage of an auxiliary power supply unit to an output of a main power supply unit.

FIG. 3 shows an improved, third power supply unit arrangement 30 comprising a main power supply unit 11 and an auxiliary power supply unit 12. In this case, the main power supply unit 11 corresponds in terms of design to the design of the arrangement 10 shown in FIG. 1. The auxiliary power supply unit 12 in turn has a flyback converter, but in contrast to FIG. 1, this flyback converter only comprises a first part that provides the first auxiliary voltage of 11.5 V and not a further second part that provides a second auxiliary voltage of 5 V.

In this example, too, a setpoint voltage of the auxiliary power supply unit 12 is slightly below the control voltage of the main power supply unit 11. The difference is 0.5 V, i.e., slightly more than 4%. In general, a reduction of 0.3 to 1.8 volt or 2.5 to 15% is provided. Owing to the reduction, it is possible to ensure, inter alia, that feeding the common output in any event takes place by the main power supply unit 11 during operation of the main power supply unit 11.

To avoid a disruption of a control loop 18 and in particular to avoid a reduction in the duty factor of the flyback converter of the auxiliary power supply unit 12 by an open-loop control circuit 17 to a duty factor of 0%, an additional circuit 31 is provided in the third power supply unit arrangement 30 shown in FIG. 3, which additional circuit 31 prevents an increase in an internal voltage at an internal node 32 to an external voltage of the main power supply unit 11 as at a first node 15.

In particular, the auxiliary power supply unit 12 now comprises a first electrical path 33 that provides the output voltage of the auxiliary power supply unit 12 at the first node 15 to feed the voltage of the auxiliary power supply unit 12 into the first output 13 of the main power supply unit 11. Moreover, the auxiliary power supply unit 12 comprises a second electrical path 34 that provides the voltage generated by the auxiliary power supply unit 12 at the internal node 32. The voltage at the node 32 can be used, for example, to supply electricity to a microcontroller of the power supply unit arrangement 30.

In comparison with the circuit shown in FIG. 1, the voltage divider between the first node 15 and ground potential is extended by an additional resistor R5, which, via an additional diode D6, corrects feedback which has been falsified by the presence of an external voltage at the first node 15.

If the main power supply unit 11 is switched on, the voltage divider first signals the output voltage of 12 V of the main power supply unit, but in the event that the duty factor of the switched-mode converter of the auxiliary power supply unit 12 subsequently falls, the voltage at the internal node 32 will drop until the additional diode D6 between the resistors R4 and R5 and the internal node 32 is switched on. If the diode D6 is on, the output voltage of the auxiliary power supply unit 12 is determined via a second voltage divider between the internal node 32 and ground potential, comprising the diode D6, the resistor R5 and the resistor R3, by the control amplifier U1. In this case, the resistors R3, R4 and R5 need to be dimensioned such that the setpoint voltage between R3 and R5 is also approximately 2.5 V, for example, in this case, too. This means that the output voltage of the switched-mode converter of the auxiliary power supply unit 12 does not fall any further than to 11 V or 10.5 V, for example. This prevents the duty factor of the control loop 18 falling to 0% and the auxiliary power supply unit 12 being completely disconnected.

Since the additional component parts used are not arranged in the first electrical path 33 provided to supply electricity, inexpensive low-level signal components can be used and only a minimal power loss is produced. When dimensioning the resistor R4, it is necessary to consider that the current through the resistor R4 needs to be so low that it does not raise the voltage at the internal node 32 so far to prevent recharging of the storage capacitor C4 via the diode D4 of the flyback converter. Furthermore, the resistor R4 should have a substantially lower resistance than the resistor R5 such that the voltage in the case of the internal control loop via the components C4, D6, R5, R3 and U1 is not substantially lower than the voltage which is set in the case of closed-loop control via the external control loop comprising the components C3, R4, R5, R3 and U1. As a result, this means that the sum of the resistances of the resistors R4 and R5 can only be slightly greater than the resistance of the resistor R5 on its own.

Figure 4:
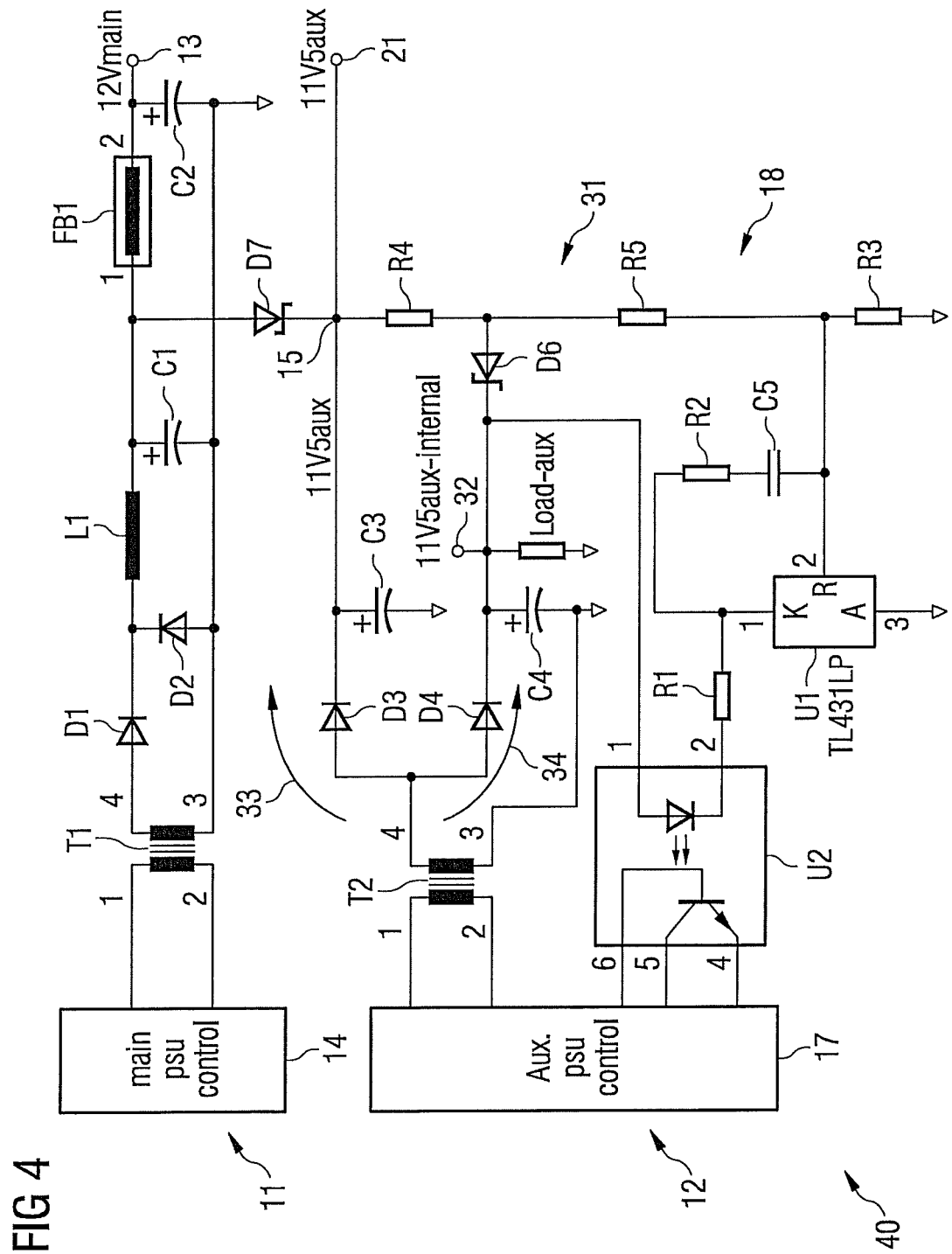
FIG. 4 shows a fourth circuit for coupling-in an output voltage of a main power supply unit to an output of an auxiliary power supply unit.

FIG. 4 illustrates a fourth power supply unit arrangement 40 based on the power supply unit arrangement 20 shown in FIG. 2. However, the auxiliary power supply unit 12 as explained with reference to FIG. 3, in turn only provides a single output voltage of 11.5 V, for example.

The power supply unit arrangement 40 shown in FIG. 4 has also been extended by an additional circuit 31, with the result that, when a voltage of the main power supply unit 11 is fed in via a diode D7 to a first output 21 of the auxiliary power supply unit 12, a disruption of the control loop 18 is avoided. In this case, the design and the closed-loop control of the additional circuit 31 correspond to the components previously described in respect of the power supply unit arrangement 30 shown in FIG. 3.

In contrast to the case of the control loop 18 of the auxiliary power supply unit 12, a corresponding addition in the control loop of the main power supply unit 11, which control loop is not illustrated in FIG. 4, is not required. First, the diode D7 used to reduce the voltage of the main power supply unit 11 in any case acts as a barrier. Second, the output voltage of the auxiliary power supply unit 12 at the first node 15 is lower than the control voltage of the main power supply unit 11, with the result that a limitation of the switched-mode converter of the main power supply unit 11 given simultaneous operation of the auxiliary power supply unit 12 would in any case not take place.

Figure 5:
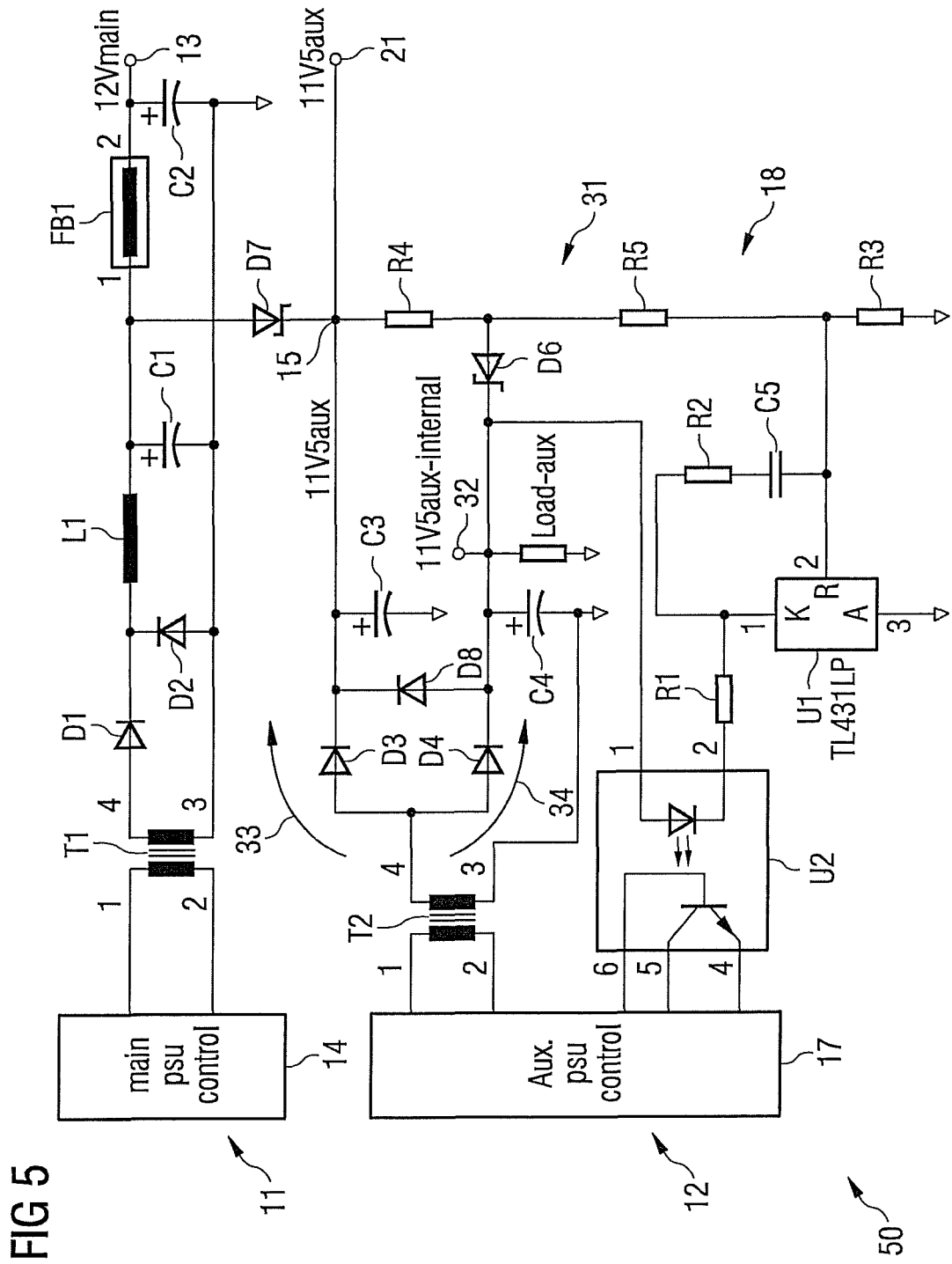
FIG. 5 shows a fifth circuit for coupling-in an output voltage of a main power supply unit to an output of an auxiliary power supply unit.

In accordance with a further, fifth configuration of a power supply unit arrangement 50 illustrated in FIG. 5, an additional diode D8 can be arranged from the positive terminal of the storage capacitor C4 to the storage capacitor C3 to discharge any excess voltage in the second electrical path 34 into the first electrical path 33. In this case, the anode of the additional diode D8 needs to be connected to the storage capacitor C4 and the cathode of the additional diode D8 needs to be connected to the storage capacitor C3. Otherwise, the configuration shown in FIG. 5 corresponds to the fourth power supply unit arrangement 40 illustrated in FIG. 4.

The power supply unit arrangement 50 shown in FIG. 5 is suitable in particular when, owing to switching peaks of the transformer T2 on a low load across the second electrical path 34 and at the same time on a high load across the first electrical path 33, an excessively high voltage is built up across the internal node 32.

An equivalent protective circuit comprising an additional diode D8 can also be used in the power supply unit arrangement 30 shown in FIG. 3. However, this is not illustrated in the figure for reasons of simplicity.

Figure 6:
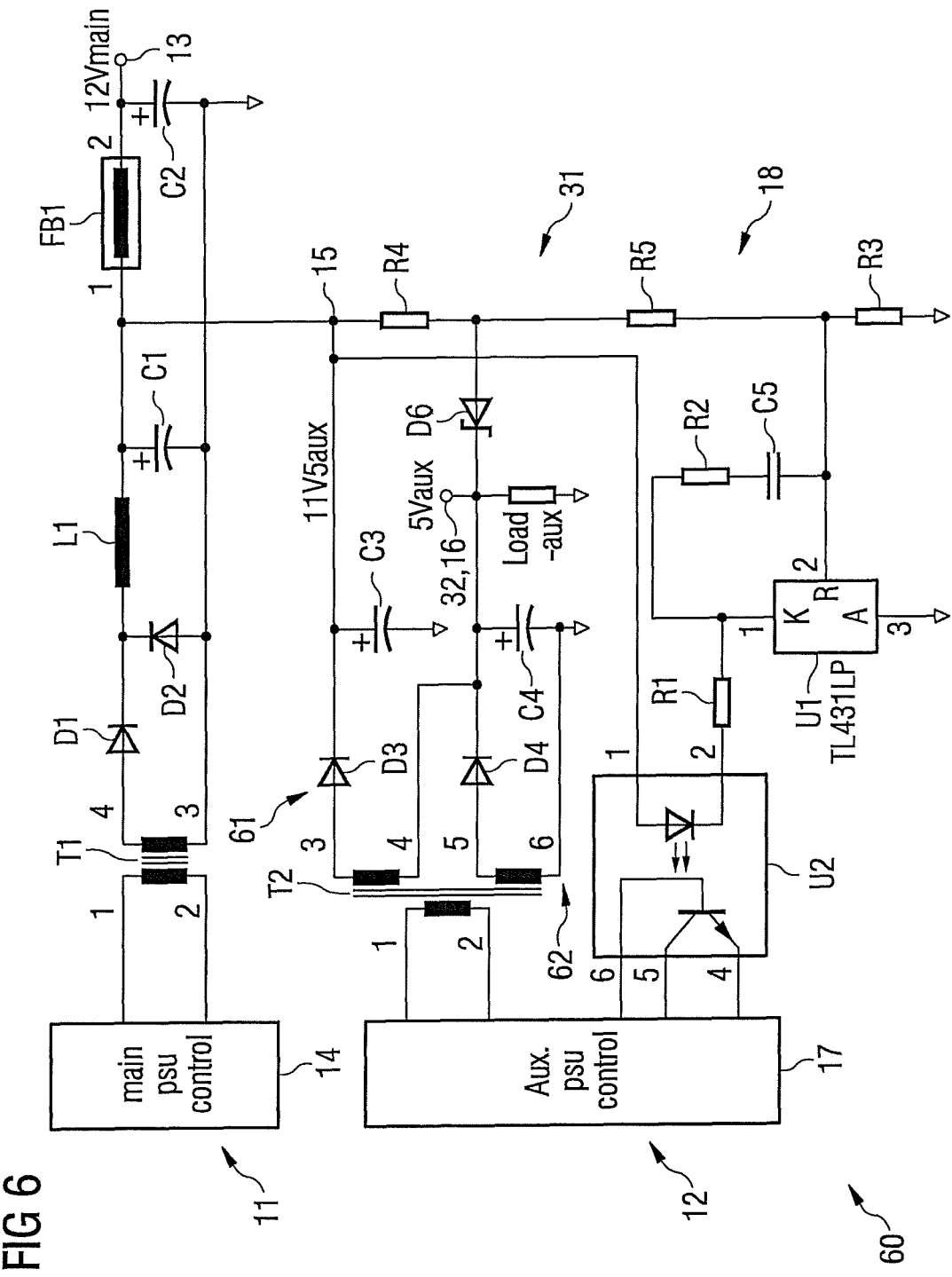
FIG. 6 shows a sixth circuit for coupling-in an output voltage of an auxiliary power supply unit to an output of a main power supply unit.

FIG. 6 shows a configuration of a sixth power supply unit arrangement 60. The sixth power supply unit arrangement substantially corresponds to the first power supply unit arrangement 10. In particular, the auxiliary power supply unit 12 shown in FIG. 6 provides two different auxiliary voltages of 11.5 V and 5 V at a first node 15 and at a second output 16, respectively, via a first part 61 and a second part 62 of a converter circuit. As in the power supply unit arrangement 30 shown in FIG. 3, the first node 15 connects to a first output 13 of a main power supply unit 11 without the use of a coupling-in diode to provide the first auxiliary voltage of 11.5 V of the auxiliary power supply unit 12 in a standby state across the common first connection 13 of the main power supply unit 11.

In contrast to the power supply unit arrangement 30 shown in FIG. 3, in the example illustrated in FIG. 6 the second auxiliary voltage of 5 V is used to generate an internal voltage at an internal node 32 for the closed-loop control of the auxiliary power supply unit 12 when an external voltage of the main power supply unit 11 is present at the first node 15. In this case, the second part 62 of the switched-mode converter that generates the second auxiliary voltage of 5 V performs the function of the second electrical path 34 in FIG. 3.

For this purpose, the second auxiliary voltage of 5 V electrically connects to the external control loop 18 via an additional circuit 31. In particular, the internal node 32 connects via a diode D6 to a tap between the resistor R4 and an additional resistor R5 of a voltage divider between the first node 15 and ground potential. When dimensioning the resistors R3, R4 and R5, it is of course necessary to appropriately consider the ratio of the first and second auxiliary voltages. In particular, the abovementioned rule in respect of dimensioning of the resistors, whereby the resistor R4 has a resistance substantially lower than that of the resistor R5, no longer applies here. The resistor R4, however, should still be dimensioned and have such a high resistance that it does not raise the voltage at the internal node 32 during operation of the main power supply unit such that the control loop 18 reduces the duty factor to 0%. In this case, too, closed-loop control of the auxiliary power supply unit 12 then takes place on the basis of the voltage at the internal node 32 instead of the voltage at the first node 15 when the main power supply unit 11 is disconnected. In respect of the function of the circuit, reference is made to the above statements in respect of the power supply unit arrangement 30.

Figure 7:
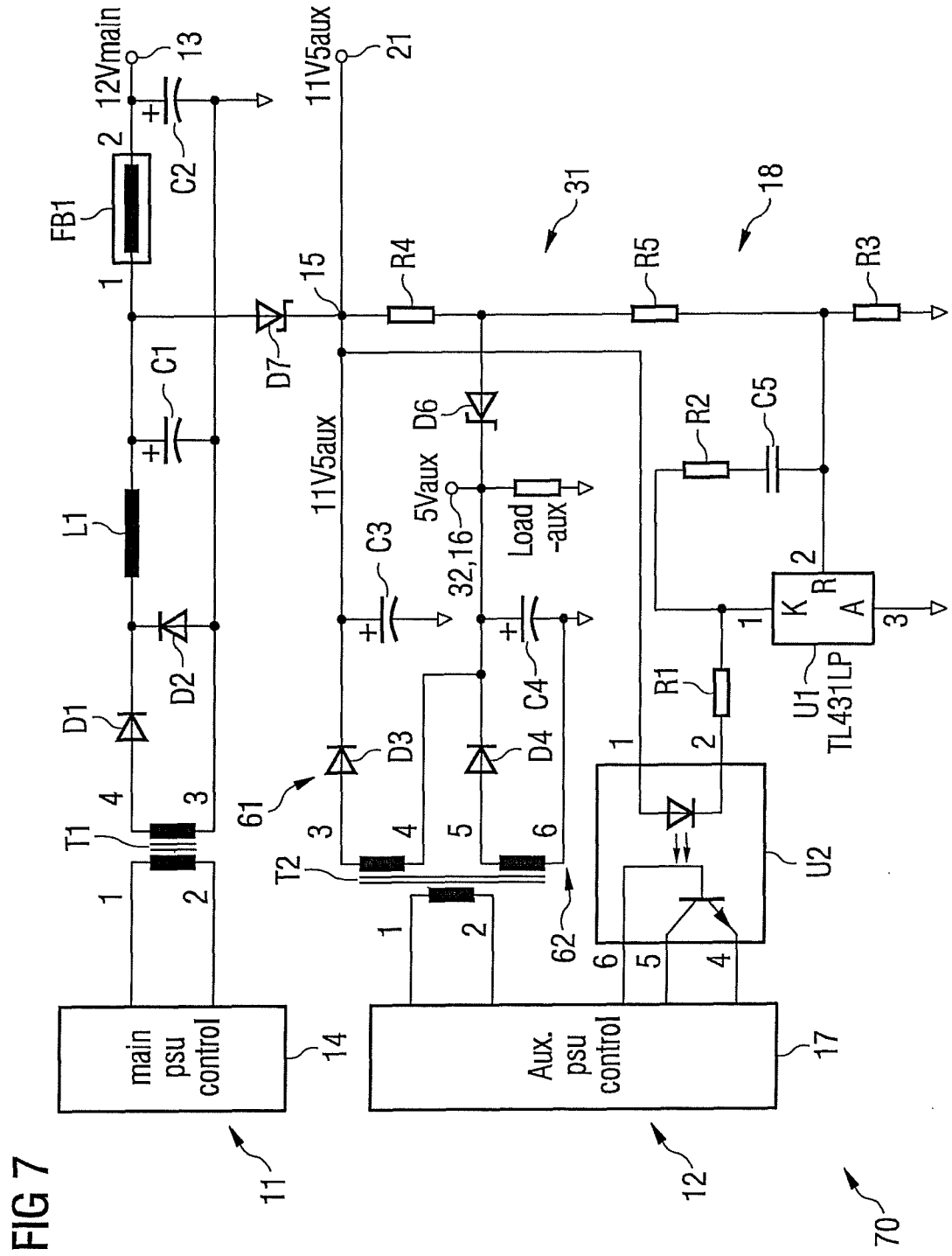
FIG. 7 shows a seventh circuit for coupling-in an output voltage of a main power supply unit to an output of an auxiliary power supply unit.

Finally, FIG. 7 shows a seventh power supply unit arrangement 70, in which, as in FIG. 2, in turn an output voltage of a main power supply unit 11 is coupled in onto a first output 21 of an auxiliary power supply unit 12. For this purpose, as is already the case in the power supply unit arrangements 20, 40 and 50, a diode D7 is used. To avoid a disruption of the control loop 18 of the auxiliary power supply unit 12 in this case, too, in turn a second auxiliary voltage of the auxiliary power supply unit 12 of 5 V generated by a second part 62 of the switched-mode converter, is in turn used as reference potential for the closed-loop control of the open-loop control circuit 17, as described above with reference to FIG. 6, when a voltage of the main power supply unit 11 is present at a first node 15.

This disclosure is not restricted to the examples illustrated. In particular, a closed-loop control circuit in accordance with the appended claims is suitable for use in any desired power supply unit arrangements with two or more power supply units in which the output voltages of different power supply units are intended to be output via a common output.

The converter circuits of the main power supply unit and the auxiliary power supply unit, which converter circuits are described in the examples, are also only exemplary in nature.

Furthermore, it is insignificant whether the reduction or increase in a voltage or a current for the closed-loop control of the auxiliary power supply unit is effected by the described additional circuits as long as a control loop of the auxiliary power supply unit is preserved electrically at least partially by an influence which is caused by application of an external voltage at a common output.

The invention claimed is:

1. A closed-loop control circuit for an auxiliary power supply unit comprising: a control loop for the closed-loop control of a voltage transformer of the auxiliary power supply unit via a controlled variable to produce a setpoint voltage, wherein the control loop comprises an additional circuit that limits a change in the controlled variable in the event of provision of an external voltage of a main power supply unit at a first output for emitting voltage generated by the auxiliary power supply unit when the external voltage exceeds a setpoint voltage of the auxiliary power supply unit.

2. The closed-loop control circuit according to claim 1, wherein the controlled variable comprises a duty factor that drives the voltage transformer of the auxiliary power supply unit and the additional circuit prevents a drop in the duty factor to 0% independently of the presence of the external voltage.

3. The closed-loop control circuit according to claim 1, wherein the control loop comprises an internal node that provides the controlled variable for the closed-loop control of the voltage transformer of the auxiliary power supply unit.

4. The closed-loop control circuit according to claim 3, wherein the controlled variable comprises a control voltage at an internal node of the closed-loop control circuit, and the additional circuit prevents an increase in an internal voltage, provided by the voltage transformer of the auxiliary power supply unit at the internal node, to the external voltage provided at the first output.

5. The closed-loop control circuit according to claim 4, further comprising a first electrical path that provides an output voltage of the voltage transformer of the auxiliary power supply unit at a first output and a second electrical path that provides the output voltage of the voltage transformer at the internal node of the auxiliary power supply unit.

6. The closed-loop control circuit according to claim 4, further comprising a transformer circuit having a first part that provides a first output voltage of the voltage transformer at the first output and a second part that provides a second output voltage of the voltage transformer at the internal node and a second output of the auxiliary power supply unit.

7. The closed-loop control circuit according to claim 4, further comprising a first voltage divider that divides a voltage between the first output and a common reference potential, and a second voltage divider that divides a voltage between the internal node and the common reference potential.

8. The closed-loop control circuit according to claim 7, wherein the first voltage divider comprises a first, second and third resistor element connected in series between the first output and the common reference potential, and the second voltage divider comprises the second and third resistor element connected in series between the internal node and the common reference potential, and the control loop determines a control voltage between the second and third resistor elements.

9. The closed-loop control circuit according to claim 8, wherein the second voltage divider further comprises a diode element (D6) connected between the internal node and the second resistor element.

10. The closed-loop control circuit according to claim 3, further comprising an electrical consumer of the auxiliary power supply unit, an internal load of the auxiliary power supply unit or a measuring resistor, which consumer connects electrically between the internal node and a common reference potential.

11. The closed-loop control circuit according to claim 1, wherein the voltage generated by the voltage transformer of the auxiliary power supply unit is provided at a first node, and the first node electrically connects to the common output directly without a coupling-in diode interposed.

12. A power supply unit arrangement comprising:
at least one main power supply unit that provides at least one first operating voltage that supplies an electrical consumer in a first operating state, and
at least one auxiliary power supply unit that provides at least one second operating voltage that supplies the electrical consumer in a second operating state,
wherein
the electrical consumer has a lower power in a second operating state than in a first operating state,
a setpoint voltage of the auxiliary power supply unit is below a control voltage of the main power supply unit,
the at least one first operating voltage of the main power supply unit and the at least one second operating voltage of the auxiliary power supply unit are available to the electrical consumer via a common first output of the power supply unit arrangement, and
the auxiliary power supply unit comprises a closed-loop control circuit according to claim 1.

13. The power supply unit arrangement according to claim 12, wherein the main power supply unit has a first open-loop control circuit, and the auxiliary power supply unit has a second open-loop control circuit independent of the first open-loop control circuit.

14. The power supply unit arrangement according to claim 12, further comprising a main output formed by the first output that supplies the electrical consumer in the first operating state and the second operating state, wherein, in the first operating state, the first operating voltage of the main power supply unit is provided at the main output, and in the second operating state, the second operating voltage of the auxiliary power supply unit is provided at the main output.

15. The power supply unit arrangement according to claim 12, further comprising at least one main output that supplies the electrical consumer in the first operating state and at least one auxiliary output formed by the first output to supply the electrical consumer in the first operating state and in the second operating state, wherein, in the first operating state, the first operating voltage of the main power supply unit is provided at the main output and the auxiliary output and, in the second operating state, the second operating voltage of the auxiliary power supply unit is provided at the auxiliary output.

* * * * *